United States Patent [19] … [11] Patent Number: 5,557,597
Lee et al. [45] Date of Patent: Sep. 17, 1996

[54] FOCUS ERROR DETECTOR

[75] Inventors: Chul-woo Lee; Jang-hoon Yoo, both of Seoul, Rep. of Korea

[73] Assignee: Samsung Electronics Co., Ltd., Kyunki-do, Rep. of Korea

[21] Appl. No.: 357,240

[22] Filed: Dec. 13, 1994

[30] Foreign Application Priority Data

Jul. 30, 1994 [KR] Rep. of Korea .................. 94-18932

[51] Int. Cl.$^6$ ...................................... G11B 7/00
[52] U.S. Cl. ................ 369/112; 369/120; 369/44.23; 250/201.5
[58] Field of Search .................... 369/112, 109, 369/103, 110, 122, 44.23, 44.41, 44.12; 250/201.5, 201.4, 204

[56] References Cited

U.S. PATENT DOCUMENTS 4,801,794  1/1989  Kowalski et al. .............. 250/201.5
4,841,507  6/1989  Imai et al. ..................... 369/112
5,001,333  3/1995  Marshall ....................... 369/44.23
5,295,129  3/1994  Lee ............................... 369/122
5,383,173  1/1995  Kim et al. ...................... 369/112

Primary Examiner—Georgia Y. Epps
Assistant Examiner—Kim-Kwok Chu
Attorney, Agent, or Firm—Rothwell, Figg, Ernst & Kurz

[57] ABSTRACT

A focus error detector for detecting a signal representing a degree of a focus error of an objective lens with respect to an optical disk includes two focusing lenses each for focusing the reflected light of the optical disk by splitting the reflected light into two beams with respect to the optical axis and two photo-detectors for receiving the respectively focused beams, which simplifies necessary components for a beam size method. The two focusing lenses whose focal lengths are different from each other does not necessitate use of a beam splitter, thereby contributing to reduction of necessary components and optimizing the arrangement of the components. Also, the operational stability is secured by removing the sensitivity to the tilt and shift of an optical axis.

4 Claims, 3 Drawing Sheets

FOCUS ERROR SIGNAL

FOCUS ERROR SIGNAL

FOCUS ERROR DETECTOR

BACKGROUND OF THE INVENTION

The present invention relates to a focus error detector for detecting a signal representing a degree of a focus error of an objective lens with respect to an optical disk in an optical recording and reproducing pickup, and more particularly, to a focus error detector which is not sensitive to the tilt or shift of an optical axis.

In general, an optical recording and reproducing pickup is constituted so that in order to place a recording medium such as an optical disk on a focal plane of an objective lens during record and reproduction operations, a signal representing a focus error ratio of an objective lens, caused by the vibration of the optical disk is detected and the objective lens is driven according to the signal.

In detecting the focus error of the objective lens with respect to the optical disk, an astigmatism method disclosed in U.S. Pat. No. 4,841,507 has a drawback in that, even if the optical disk is placed on the focal plane of the objective lens, the detected focus error signal is not zero when the optical axis is tilted or shifted by the vibration or a change of the optical disk over time. Thus, a high density record and reproduction with a small focus intensity is very unstable in operation, due to the frequent generation of servo errors. Also, desired data information is not recorded and reproduced cleanly.

Meanwhile, there is a conventional focus error detecting method, a so-called "beam size" method, which is less sensitive to the tilt or shift of the optical axis by the vibration or optical disk changes over time, as described above. Such a conventional focus error detector is shown in FIG. 1.

Referring to FIG. 1, the light emitted from a light source 1 becomes parallel light by a collimating lens 2, to pass through a beam splitter 3, and is focused onto an optical disk 5 by means of an objective lens 4. The reflected light of optical disk 5 becomes parallel light again by means of objective lens 4, is reflected from beam splitter 3 and then is focused by a focusing lens 6. The focused reflected light is split into two beams by a beam splitter 7. One beam is received from one photo-detector 10 in a photo-detecting unit 9 and the other beam is received from the other photo-detector 11 in photo-detecting unit 9 via a reflective prism 8. Here, ternary detectors are each used for both photo-detectors 10 and 11 as shown in FIG. 2 and are disposed before and after the focal point of focusing lens 6, so that same-sized beam spots are formed in the respective detectors when the optical disk is placed on the focal plane of the objective lens. That is to say, when the optical disk deviates from the focal plane of the objective lens, the size of beam spots formed on both photo-detectors 10 and 11 are changed with respect to each other. At this time, a signal whose magnitude and polarity are changed depending on the focus error is detected by a circuit shown in FIG. 2.

According to the above-described conventional beam size method for detecting focus error, a beam splitter is used for splitting the reflected light into two beams. Also, a reflective prism is used for the purpose of installing two ternary photo-detectors on one plane. Accordingly, costs are increased due to the additional components and miniaturization is difficult due to the resulting large volume.

Also, according to the prior art, since the distance from focusing lens 6 to photo-detector 10 is not the same with that from focusing lens 6 to photo-detector 11, if the reflected light is tilted or shifted due to vibaration or change over time of the optical disk, the spot movement of photo-detector 10 is different from that of photo-detector 11. Thus, even if the optical disk is placed on the focal plane of the objective lens, the tilted or shifted reflected light often results in a focus error.

SUMMARY OF THE INVENTION

Therefore, it is an object of the present invention to provide a simplified and inexpensive focus error detector capable of being miniaturized, for detecting a focus error by adopting a beam size method which is not sensitive to the tilt and shift of the optical axis due to the vibration or change over time of the optical disk.

To accomplish the above object, the focus error detector for an objective lens for focusing incident light onto an optical disk, according to the present invention, comprises: two focusing lenses having a different focal length from each other and each for splitting a reflected light from the optical disk into both sides with respect to the optical axis and focusing the split light; two ternary photo-detectors each for receiving split reflected light respectively focused by the two focusing lenses; and circuit means for detecting a signal representing the degree of the focus error of said objective lens with respect to the optical disk from the two ternary photo-detectors.

As described above, according to the present invention, low cost and miniaturization can be realized by removing the conventional beam splitter and reflective prism and using two focusing lenses.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
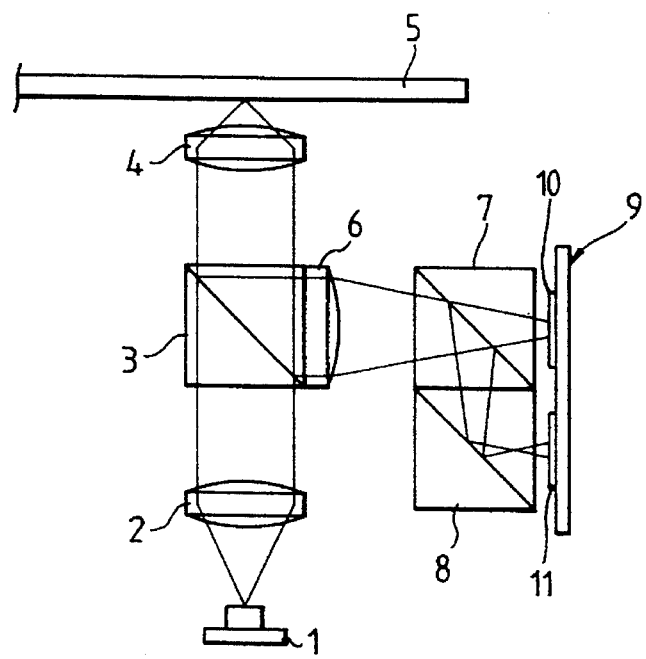
FIG. 1 shows an optical configuration of the recording and reproducing pick-up adopting a focus error detector according to the conventional beam size method.
Figure 2:
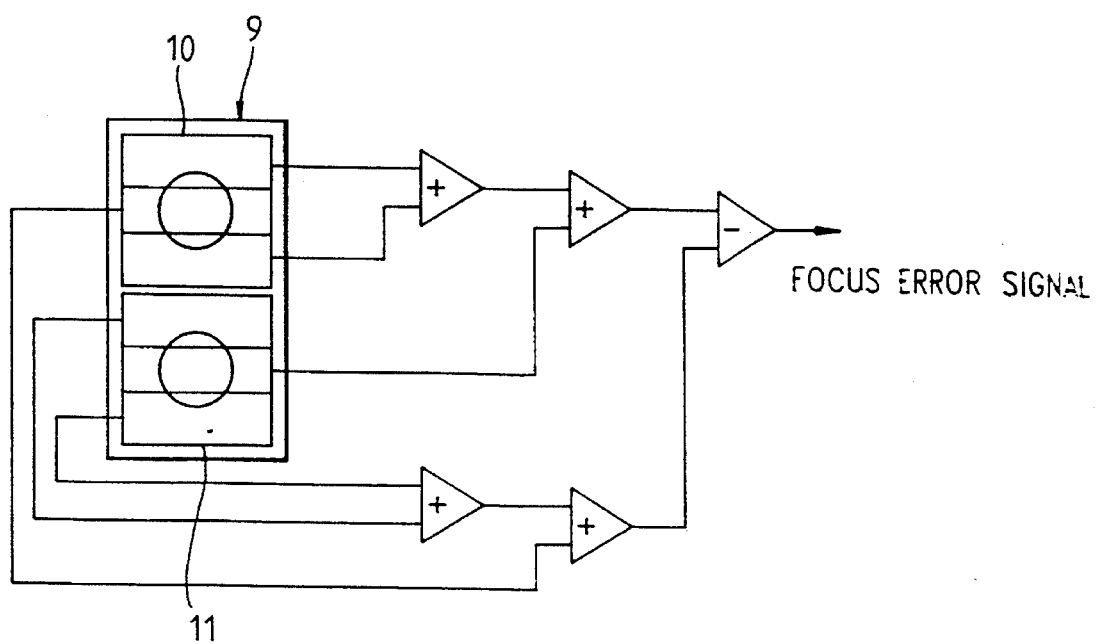
FIG. 2 shows a circuit for detecting a focus error signal from the photo-detector shown in FIG. 1.
Figure 3:
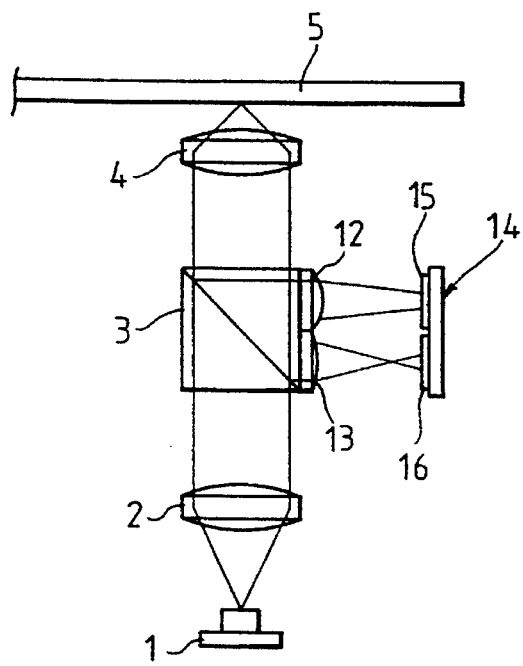
FIG. 3 shows an optical configuration of the recording and reproducing pick-up adopting a focus error detector according to the present invention.
Figure 4:
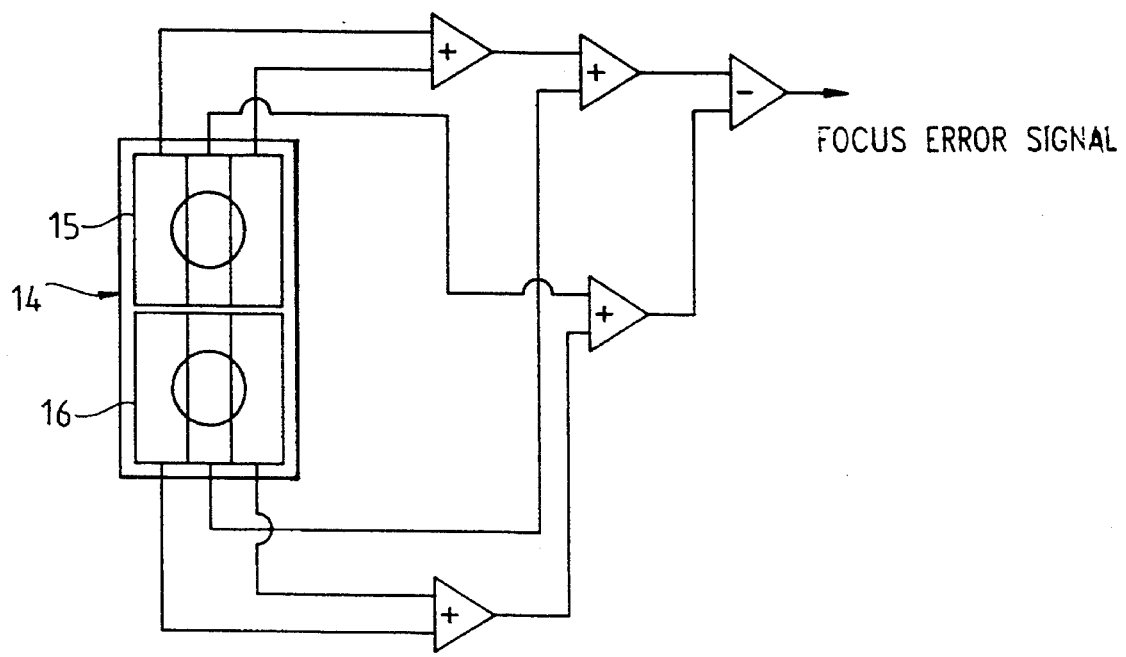
FIG. 4 shows a circuit for detecting a focus error signal from the photo-detector shown in FIG. 3.

Referring to FIG. 3, an optical pick-up includes a light source 1 for emitting light, a collimating lens 2 for forming parallel light from the emitted light, a beam splitter 3 for directing the parallel light, and an objective lens 4 for focusing the incident light directed via the beam splitter 3 onto an optical disk 5, as conventionally. Similarly, the reflected light from the optical disk 5 is reflected from the beam splitter 3 via the objective lens 4. In the present invention, in order to split the reflected light reflecting from the beam splitter 3 into two beams, two focusing lenses 12 and 13 are installed in parallel on the emitting surface of the beam splitter 3. The two focusing lenses 12 and 13 are designed so that the focal length is different from each other with respect to the same incident light. Also, in the present invention, as shown in FIG. 4, a photo-detecting unit 14 having two ternary photo-detectors 15 and 16 and each receiving two beams split and focused from the two focusing lenses 12 and 13 is disposed in the center of the respective focal points of the two focusing lenses 12 and 13. Meanwhile, circuit means for detecting a desirable focus error signal from the two photo-detectors 15 and 16 is shown in FIG. 4.

Figure 5A:
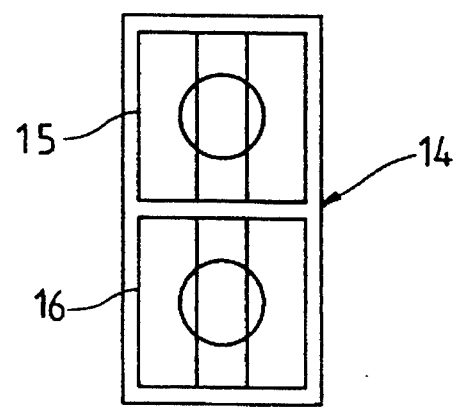
FIGS. 5A, 5B and 5C are front views showing light spots formed on the photo-detector shown in FIG. 4, depending on the focus states of an objective lens.

In the focus error detector according to the present invention having the aforementioned configuration, if the optical disk 5 is placed on the focal plane of the objective lens 4, the reflected light reflected from the optical disk 5 and passing through the objective lens 4 becomes parallel light like the incident light. Therefore, the reflected light passes through the two focusing lenses 12 and 13 to then be focused onto the corresponding focal points. At this time, since the photo detecting unit 14 is placed at the center of the respective focal points of the two focusing lenses 12 and 13, the beam spots landed on the two photo-detectors 15 and 16 are the same size, as shown in FIG. 5A. Therefore, the focus error signal detected by the circuit shown in FIG. 4 becomes zero, which indicates that the optical disk 5 is placed exactly on the focal plane of the objective lens 4.

Figure 5B:
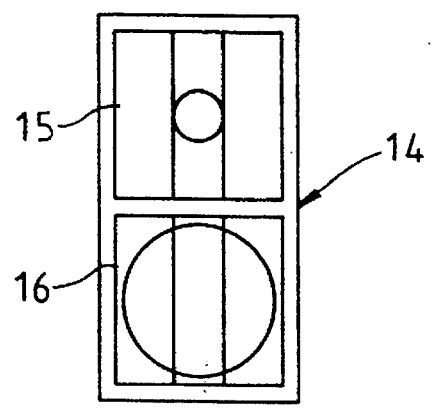
Figure 5C:
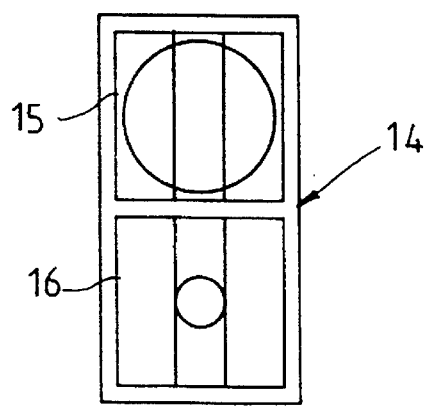

However, if the optical disk 5 deviates from the focal plane of the objective lens 4, becoming more distant or closer, the reflected light passing through the objective lens 4 is converged or diverged, so that the respective focal lengths of the two focusing lenses 12 and 13 with respect to the reflected light are shortened or lengthened. At this time, as shown in FIGS. 5B and 5C, the size of the respective beam spots landed on photo-detectors 15 and 16 increase or decrease with respect to each other. Then, the focus error signals detected by the circuit shown in FIG. 4. are different in magnitude depending on the changed sizes of the beam spots, i.e., the degree of the optical disk 5 deviating from the focal plane of the objective lens 4, and in polarity depending on the deviated direction.

Meanwhile, in an on-focus state, when the reflected light is tilted or shifted due to the vibration or change over time of the optical disk 5, since the distance from focusing lens 12 to photo-detector 15 is the same with that from focusing lens 12 to photo-detector 16, the spot movements of photo-detectors 15 and 16 is the same with each other. The difference between the signals detected depending on the change in light amount for the respective photo-detectors according to the spot movements are offset to then be removed. Therefore, in the on-focus state, the tilted or shifted reflected light does not cause a focus error.

As described above, according to the present invention, the focus error detector adopting the beam size method is constituted only by two focusing lenses having the respective focal lengths designed differently, thereby simplifying the configuration to reduce the cost and to allow miniaturization. Specifically, since two focusing lenses focus beams onto the respective optical axes, the focus error signal detector becomes insensitive to the tilts and shifts of the optical axes for the reflected light incident thereto. That is to say, an optically excellent and stable operation of the present invention allows desired data information to be recorded and reproduced cleanly. Also, the focus error signal detector according to the present invention is advantageous for the optical recording and reproducing pickup of high density.

What is claimed is:

1. A focus error detector for an objective lens for focusing incident light onto an optical disk, comprising:

a beam splitter for splitting light reflected from the optical disk and passing through the objective lens from incident light incident to the objective lens;

two focusing lenses each having a focal length different from the other and each for receiving light reflected from the optical disk via said beam splitter and focusing the received light, said two focusing lenses being attached on an emitting surface for emitting the received light;

two ternary photo-detectors each for receiving the light respectively focused by said two focusing lenses; and circuit means for detecting a signal representing the degree of the focus error of said objective lens with respect to said optical disk from said two ternary photo-detectors.

2. The focus error detector as claimed in claim 1, wherein said two focusing lenses are disposed on one plane and wherein said two photo-detectors are disposed on one plane at the center of the respective focal points of said two focusing lenses.

3. A focus error detector for an objective lens for focusing incident light onto an optical disk, comprising:

two focusing lenses disposed on one plane, each having a different focal length from the other and each for receiving light reflected from the optical disk and focusing the received light;

two ternary photo-detectors disposed on one plane at the center of the respective focal points of said two focusing lenses, each of said ternary photo-detectors for receiving the light respectively focused by said two focusing lenses; and circuit means for detecting a signal representing the degree of the focus error of said objective lens with respect to said optical disk from said two ternary photo-detectors.

4. The focus error detector as claimed in claim 3, wherein said focus error detector further comprises a beam splitter for splitting the reflected light reflected from said optical disk and passing through said objective lens from incident light incident to said objective lens.

* * * * *